United States Patent
Chirico et al.

(10) Patent No.: US 12,466,353 B2
(45) Date of Patent: Nov. 11, 2025

(54) FRONT FLAP HINGE FOR A MOTOR VEHICLE AND MOTOR VEHICLE COMPRISING A FRONT FLAP HINGE OF THIS TYPE

(71) Applicant: Bayerische Motoren Werke Aktiengesellschaft, Munich (DE)

(72) Inventors: Dario Chirico, Munich (DE); Stefan Putz, Bergen (DE); Marko Riedlbeck, Markt Indersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 14 days.

(21) Appl. No.: 18/844,087

(22) PCT Filed: Jun. 6, 2023

(86) PCT No.: PCT/EP2023/065028
§ 371 (c)(1),
(2) Date: Sep. 5, 2024

(87) PCT Pub. No.: WO2024/002628
PCT Pub. Date: Jan. 4, 2024

(65) Prior Publication Data
US 2025/0074353 A1  Mar. 6, 2025

(30) Foreign Application Priority Data
Jul. 1, 2022 (DE) ............ 10 2022 116 438.1

(51) Int. Cl.
*B60R 21/38* (2011.01)
*B62D 25/12* (2006.01)
(Continued)

(52) U.S. Cl.
CPC .............. *B60R 21/38* (2013.01); *B62D 25/12* (2013.01); *E05D 3/145* (2013.01);
(Continued)

(58) Field of Classification Search
CPC ............ B60R 21/38; B60R 2021/0023; B60R 2023/0009; B62D 25/12; E05Y 2800/252;
(Continued)

(56) References Cited

U.S. PATENT DOCUMENTS 4,125,170 A * 11/1978 Botz ................... E05F 1/1276
296/76
5,263,546 A * 11/1993 Cady ..................... B60R 19/00
16/337

(Continued)

FOREIGN PATENT DOCUMENTS

DE  10 2015 109 128 B3  7/2016
DE  10 2017 130 621 A1  6/2018
(Continued)

OTHER PUBLICATIONS

International Search Report (PCT/ISA/210) issued in PCT Application No. PCT/EP2023/065028 dated Sep. 11, 2023 with English translation (6 pages).
(Continued)

*Primary Examiner* — Timothy Wilhelm
(74) *Attorney, Agent, or Firm* — Crowell & Moring LLP

(57) ABSTRACT

A front flap hinge for a motor vehicle comprises a hinge upper part and a front flap securing element which can be secured to a front flap of the motor vehicle and is connected to the hinge upper part such that it can swivel about a first pivot axis extending in a transverse direction. The hinge upper part comprises a guide element in which a guide counter element of the front flap securing element is guided in a first crash scenario. The guide counter element can be removed from the guide element in a second crash scenario. The invention also relates to a motor vehicle comprising a front flap hinge of this type.

9 Claims, 1 Drawing Sheet

(51) Int. Cl.
  *E05D 3/14* (2006.01)
  *E05D 11/00* (2006.01)
(52) U.S. Cl.
  CPC ... *E05D 2011/009* (2013.01); *E05Y 2800/252* (2013.01); *E05Y 2900/536* (2013.01)
(58) Field of Classification Search
  CPC ......... E05Y 2900/536; E05D 2011/009; E05D 3/145
  See application file for complete search history.

(56) References Cited

U.S. PATENT DOCUMENTS

| | | | | |
|---|---|---|---|---|
| 5,385,212 | A * | 1/1995 | Cady | B60R 19/00 180/274 |
| 5,639,002 | A * | 6/1997 | Weitbrecht | E05C 17/28 224/539 |
| 6,167,977 | B1 * | 1/2001 | Adamson | B62D 25/10 16/361 |
| 6,439,330 | B1 * | 8/2002 | Paye | E05D 3/022 180/274 |
| 6,439,626 | B1 * | 8/2002 | Rohlfing | E05B 85/10 16/110.1 |
| 6,953,220 | B2 * | 10/2005 | Takehara | B62D 25/105 296/193.11 |
| 7,073,846 | B2 * | 7/2006 | Borg | B60R 21/38 180/274 |
| 7,077,225 | B2 * | 7/2006 | Minami | E05D 11/00 180/69.21 |
| 7,182,388 | B2 * | 2/2007 | Habacker | B60J 7/202 296/107.08 |
| 7,303,040 | B2 * | 12/2007 | Green | B62D 25/12 180/274 |
| 7,374,008 | B1 * | 5/2008 | Neal | B60R 21/38 180/274 |
| 7,559,399 | B2 * | 7/2009 | Lewis | B60R 21/38 180/274 |
| 7,594,555 | B2 * | 9/2009 | Lutter | B60R 21/38 180/274 |
| 7,690,465 | B2 * | 4/2010 | Hirata | B60R 21/34 180/69.2 |
| 7,712,569 | B2 * | 5/2010 | Scheuch | B60R 21/38 180/274 |
| 7,730,990 | B2 * | 6/2010 | Boggess | B62D 25/12 180/274 |
| 7,845,053 | B2 * | 12/2010 | Marsh | E05F 1/1215 16/306 |
| 7,861,818 | B2 * | 1/2011 | Boggess | B62D 25/12 180/274 |
| 7,866,697 | B2 * | 1/2011 | Norum | B60N 2/888 70/276 |
| 7,926,603 | B2 * | 4/2011 | Bonsen | E05C 17/16 296/193.11 |
| 8,230,960 | B2 * | 7/2012 | Shoen | E05C 17/14 296/193.11 |
| 8,484,804 | B2 * | 7/2013 | Mehta | B62D 25/12 180/274 |
| 8,534,410 | B2 * | 9/2013 | Nakaura | E05B 77/08 180/274 |
| 8,579,061 | B2 * | 11/2013 | Radomski | B62D 25/12 180/274 |
| 8,768,574 | B1 * | 7/2014 | Shaw | B60R 21/38 180/274 |
| 8,863,879 | B1 * | 10/2014 | Domlovil | B62D 25/12 180/69.2 |
| 8,899,363 | B1 * | 12/2014 | LaPorte | B62D 25/12 180/69.2 |
| 9,085,282 | B2 * | 7/2015 | Agell Merino | B60R 21/38 |
| 9,327,677 | B2 * | 5/2016 | Fermer | B60R 21/38 |
| 9,340,179 | B2 * | 5/2016 | Kim | E05B 77/08 |
| 9,366,066 | B2 * | 6/2016 | Hwang | G06F 1/16 |
| 9,476,237 | B2 * | 10/2016 | Sato | E05D 3/02 |
| 9,481,340 | B2 * | 11/2016 | Kim | E05D 3/145 |
| 9,701,277 | B2 * | 7/2017 | McIntyre | B60R 21/38 |
| 9,855,916 | B2 * | 1/2018 | Hwang | E05D 7/1066 |
| 10,100,565 | B2 * | 10/2018 | Waskie | E05D 15/48 |
| 10,124,878 | B2 * | 11/2018 | Buttelmann | E05F 15/53 |
| 10,214,246 | B2 * | 2/2019 | Cheon | B62D 65/06 |
| 10,232,818 | B2 * | 3/2019 | Jenny | B60R 21/36 |
| 10,315,612 | B2 * | 6/2019 | Yamada | B60R 21/38 |
| 10,315,613 | B2 * | 6/2019 | Patterson | E05D 11/08 |
| 10,369,959 | B2 * | 8/2019 | McLundie | B60R 21/38 |
| 10,752,201 | B2 * | 8/2020 | Fredriksson | E05D 11/1014 |
| 10,883,293 | B2 * | 1/2021 | Springsklee | E05D 3/145 |
| 11,168,498 | B2 * | 11/2021 | Distefano | E05B 85/243 |
| 11,199,032 | B2 * | 12/2021 | Menke | E05B 63/244 |
| 11,268,297 | B2 * | 3/2022 | Nottebaum | E05B 83/24 |
| 11,383,672 | B2 * | 7/2022 | Wood | B62D 25/105 |
| 11,473,346 | B2 * | 10/2022 | Nottebaum | E05B 81/14 |
| 11,473,358 | B2 * | 10/2022 | Schabenberger | E05D 5/0207 |
| 11,697,952 | B2 * | 7/2023 | Ottino | E05F 1/105 49/139 |
| 11,885,159 | B2 * | 1/2024 | Johann | E05B 83/24 |
| 11,897,414 | B2 * | 2/2024 | Boiger | B60R 21/38 |
| 11,970,897 | B2 * | 4/2024 | Czechtizky | E05F 15/63 |
| 12,172,597 | B2 * | 12/2024 | McDonald | E05F 15/75 |
| 2009/0289473 | A1 * | 11/2009 | Kmieciak | B60R 21/38 296/193.11 |
| 2009/0302644 | A1 * | 12/2009 | Mori | B60R 21/38 296/193.11 |
| 2013/0227818 | A1 * | 9/2013 | Zippert | B60R 21/38 16/366 |
| 2016/0076279 | A1 * | 3/2016 | Ilea | E05B 83/24 292/220 |
| 2018/0179799 | A1 | 6/2018 | Waskie et al. | |
| 2019/0218833 | A1 * | 7/2019 | Nelsen | E05B 83/24 |
| 2020/0164831 | A1 * | 5/2020 | Wood | B62D 25/105 |
| 2020/0165851 | A1 * | 5/2020 | Page | E05D 11/1007 |
| 2021/0370864 | A1 * | 12/2021 | Distefano | E05B 85/04 |
| 2023/0160240 | A1 * | 5/2023 | Kim | E05B 79/20 296/193.11 |

FOREIGN PATENT DOCUMENTS

FR   3 102 450 A1   4/2021
FR   3 102 451 A1   4/2021

OTHER PUBLICATIONS

German-language Written Opinion (PCT/ISA/237) issued in PCT Application No. PCT/EP2023/065028 dated Sep. 11, 2023 with English translation (7 pages).

German-language Search Report issued in German Application No. 10 2022 116 438.1 dated Feb. 16, 2023 with partial English translation (10 pages).

* cited by examiner

FRONT FLAP HINGE FOR A MOTOR VEHICLE AND MOTOR VEHICLE COMPRISING A FRONT FLAP HINGE OF THIS TYPE

BACKGROUND AND SUMMARY

The present disclosure relates to a front flap hinge and a motor vehicle having such a front flap hinge.

Various configurations of front flap hinges for motor vehicles are known from the prior art for pivotably supporting a front flap on a body of the motor vehicle.

DE 102 2015 109 128 B3 describes, for example, a front flap hinge for a motor vehicle having a first hinge member and a second hinge member which are connected to each other in an articulated manner in order to open and close an engine hood. One of the two hinge members comprises for pedestrian protection a base component and a pivot element having a first bearing region on the body and a second bearing region on the engine hood. The pivot element has in one of the two bearing regions a movable bearing so that the pivot element can be unlocked by way of a rotational movement and can be lifted from a basic position into an impact position.

The movable bearing of the front flap hinge known from DE 10 2015 109 128 B3 thus enables a defined pivoting of the engine hood for pedestrian protection. As a result of the configuration of the movable bearing, the movable bearing has a constant rigidity in different crash situations.

An optimum absorption of forces acting on the motor vehicle in different crash situations, that is to say, with different force introduction directions, places different rigidity demands on the front flap hinge.

Based on the front flap hinge described in DE 2015 109 128 B3, an object of the present disclosure is to provide a front flap hinge for a motor vehicle which in different crash situations safely supports a front flap of a motor vehicle and absorbs and transmits forces acting on the front flap hinge in an appropriate manner. An object of the present disclosure is further to provide a motor vehicle having such a front flap hinge.

According to the disclosure, therefore, a front flap hinge for a motor vehicle which comprises an upper hinge portion and a front flap securing element is provided. The front flap securing element can be secured to a front flap of the motor vehicle and connected to the upper hinge portion so as to be able to be pivoted about a first pivot axis which extends in the transverse direction, in particular in a functional installation state of the front flap hinge on the motor vehicle, in the transverse motor vehicle direction. The upper hinge portion comprises a guiding element. A guiding counter-element of the front flap securing element is guided in the guiding element in a first crash instance. The guiding element and the guiding counter-element are configured in such a manner that the guiding counter-element can be removed from the guiding element in a second crash instance.

The core notion of the disclosure is thus to configure the guiding element and the guiding counter-element in such a manner that they control a relative movement of the front flap securing element relative to the upper hinge portion in the first crash instance in a defined manner, whereas in the second crash instance the guiding counter-element can be removed from the guiding element so that the front flap securing element can move relative to the upper hinge portion without the relative movement being influenced by the guiding element and the guiding counter-element.

The front flap hinge according to the disclosure consequently has in the first crash instance a different rigidity from that in the second crash instance.

The transverse direction corresponds in a functional installation state of the front flap hinge in the motor vehicle to a transverse motor vehicle direction.

The front flap securing element is connected to the upper hinge portion so as to be able to be pivoted, for example, about a first pivot axis which extends in the transverse direction in such a manner that, in the first crash instance, the front flap can be pivoted in such a manner that a region, which is arranged in front of the front flap securing element in the longitudinal direction, of the front flap is pivoted downward in the vertical direction and a region, which is arranged behind the front flap securing element in the longitudinal direction, of the front flap is pivoted upward in the vertical direction.

The longitudinal direction corresponds in a functional installation state of the front flap hinge on the motor vehicle to a longitudinal motor vehicle direction.

The vertical direction corresponds in a functional installation state of the front flap hinge in the motor vehicle to a vertical motor vehicle direction.

In a preferred embodiment of the front flap hinge according to the disclosure, the guiding element in the second crash instance can be removed from the guiding element by displacing the guiding counter-element relative to the guiding element in the transverse direction and/or by pivoting the guiding counter-element about a second pivot axis which extends in particular in the vertical direction relative to the guiding element.

The second pivot axis can extend through an articulation via which the front flap is connected to the upper hinge portion so as to be able to be pivoted about the first pivot axis.

In an exemplary embodiment of the front flap hinge according to the disclosure, the guiding element is a slotted guiding member, that is to say, an elongate hole.

The guiding counter-element is, for example, a guiding journal which is arranged in the slotted guiding member.

The slotted guiding member is, for example, in the form of a circular arc.

The concave side of the slotted guiding member may be at the front in the longitudinal direction.

In a preferred embodiment of the front flap hinge according to the disclosure, the guiding element is open in an upper region in the vertical direction, at the rear in the longitudinal direction, in particular in a convex region of the slotted guiding member. The guiding element thus comprises an indentation in the upper region in the vertical direction, at the rear in the longitudinal direction. Through the indentation, the guiding counter-element can be removed from the guiding element in the second crash instance.

The guiding counter-element may comprise a pin member and a pin head.

In an exemplary embodiment of the front flap hinge according to the disclosure, the guiding element has such a length, that is to say, such an extent in the transverse direction, and/or the guiding counter-element has such play in the guiding element, that is to say, such a spacing with respect to the guiding element, that the guiding counter-element in the second crash instance can be removed from the guiding element by pivoting about the second pivot axis.

The guiding counter-element may comprise an in particular cylindrical pin body, that is to say, have no pin head.

In a preferred embodiment of the front flap hinge according to the disclosure, the first crash instance is a front-end crash.

In the front-end crash, a force acts, for example, only in the longitudinal direction and/or in the vertical direction on the motor vehicle, that is to say, no force acts in the transverse direction, or a force which acts on the motor vehicle in the transverse motor vehicle direction is below a threshold value.

In the front-end crash, the front flap hinge is thus, for example, free from a transverse force loading. On the front flap hinge, in particular on the upper hinge portion, therefore, a force acts, for example, only in the longitudinal direction and/or a force acts only in the vertical direction.

In an exemplary embodiment of the front flap hinge according to the disclosure, the second crash instance is a front-end crash, a side crash or an oblique crash.

In the front-end crash, the side crash or in the oblique crash, for example, at least also in the transverse direction, a force acts on the front flap hinge, in particular the upper hinge portion, or the force which acts in the transverse direction on the front flap hinge, in particular the upper hinge portion, equates to at least a defined threshold value.

The defined threshold value has, for example, such a size that, when a force at the level of the defined threshold value acts on the front flap hinge, the guiding counter-element can be removed from the guiding element.

In an exemplary embodiment of the front flap hinge according to the disclosure, the guiding element comprises at the upper end thereof in the vertical direction a recess which extends forward in the longitudinal direction. Consequently, the guiding element can in the first crash instance be displaced into the recess in which it is secured prior to displacement in the guiding element downward in the vertical direction.

In an exemplary embodiment, the front flap hinge according to the disclosure comprises a lower hinge portion which can be rigidly fixed to a body of the motor vehicle.

The upper hinge portion may be pivotably connected to the lower hinge portion by way of at least one link, in particular two links. Via the front flap hinge, the front flap can consequently be pivotably supported on the body about a third pivot axis which extends in the transverse direction.

The disclosure further relates to a motor vehicle comprising a front flap hinge described above.

In a preferred embodiment, the motor vehicle according to the disclosure comprises two front flap hinges described above.

The motor vehicle according to the disclosure may have a front flap and a body.

The front flap securing element is, for example, rigidly connected to the front flap.

The lower hinge portion may be rigidly fixed to the body of the motor vehicle.

The front flap can consequently be fixed by way of the front flap hinge according to the disclosure to the body so as to be able to be pivoted relative to the body.

BRIEF DESCRIPTION OF THE DRAWINGS

The disclosure is explained in greater detail below with reference to an exemplary embodiment which is illustrated in the drawings.

DETAILED DESCRIPTION OF THE DRAWINGS

Figure 1:
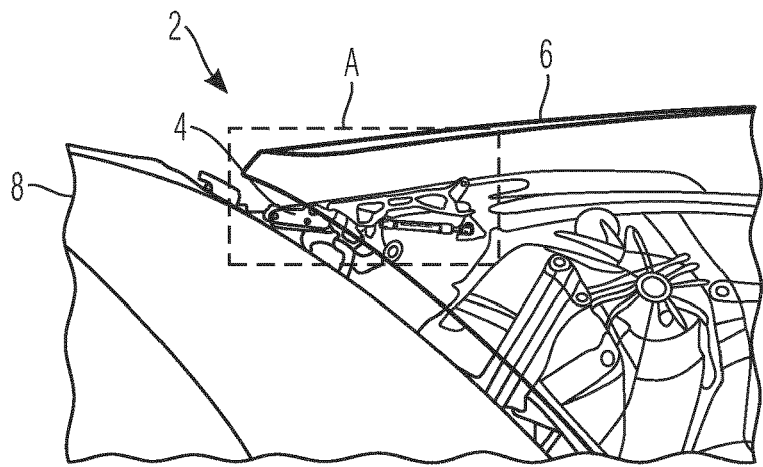
FIG. 1 shows a perspective view of a part-region of a motor vehicle according to the disclosure.

FIG. 1 shows a part-region of a motor vehicle 2 according to the disclosure. The motor vehicle 2 comprises a body 8 and a front flap 6. The front flap 6 is pivotably supported on the body 8 about a pivot axis which extends in the transverse motor vehicle direction by way of two front flap hinges 4.

The front flap hinges 4 are arranged in a mirror-symmetrical manner relative to a motor vehicle longitudinal center plane in a rear region in the longitudinal motor vehicle direction and in an outer region in the transverse motor vehicle direction on a lower side of the front flap 6.

Since the front flap hinges 4 are configured in a mirror-symmetrical manner, the following description is limited to the right front flap hinge 4 in the forward travel direction, wherein the following statements accordingly apply to the left front flap hinge in the forward travel direction.

Figure 2:
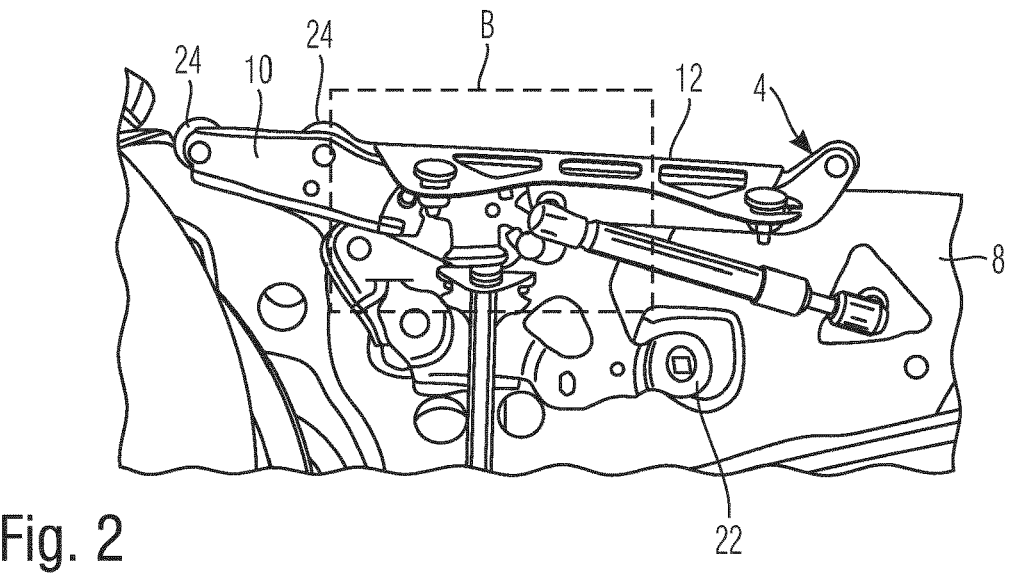
FIG. 2 shows a detailed view of the part-region A from FIG. 1 without a front flap being depicted; and, FIG. 3 shows a detailed view of the part-region B from FIG. 2.

The front flap hinge 4 comprises, as can be seen in particular in the detailed view of the region A from FIG. 1 as illustrated in FIG. 2, a lower hinge portion 22, an upper hinge portion 10, a front flap securing element 12 and two links 24.

The lower hinge portion 22 is rigidly fixed to the body 8. The two links 24 connect the upper hinge portion 10 to the lower hinge portion 22 so as to be able to be pivoted about a pivot axis which extends in the transverse motor vehicle direction. The upper hinge portion 10 is connected to the front flap securing element 12 so as to be able to be pivoted about another pivot axis which extends in the transverse motor vehicle direction. The front flap securing element 12 is rigidly fixed to a lower side of the front flap 6.

Figure 3:
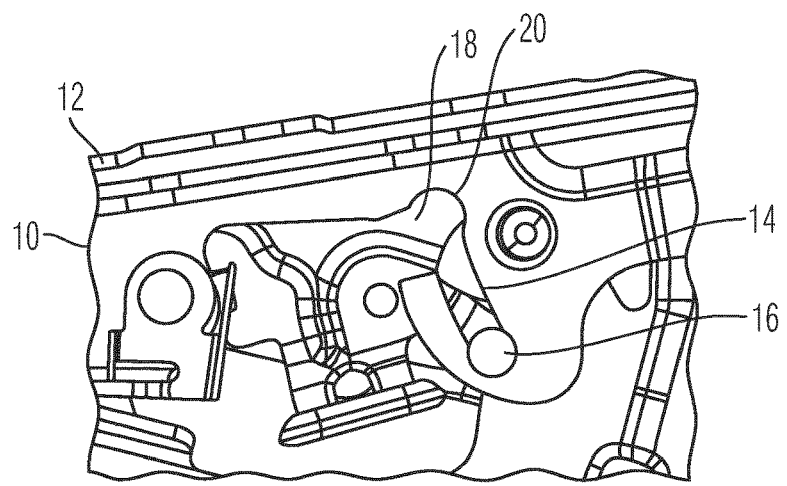

As can be seen in the detailed view of the region B from FIG. 2 as shown in FIG. 3, the upper hinge portion 10 comprises a guiding element 14. The front flap securing element 12 has a guiding counter-element 16 which corresponds to the guiding element 14.

The guiding element 14 is a slotted guiding member in the form of a circular arc. The guiding counter-element 16 is a guiding journal which extends in the transverse motor vehicle direction and which is arranged in the slotted guiding member. In a first crash instance in which only a force in the longitudinal motor vehicle direction and in the vertical motor vehicle direction acts on the front flap hinge 4, the guiding counter-element 16 is displaced upward in the guiding element 14 in the vertical motor vehicle direction.

The concave side of the slotted guiding member faces forward in the longitudinal motor vehicle direction. At an upper end in the vertical motor vehicle direction, the guiding element 14 comprises a recess 20. The recess 20 extends from the guiding element 14 forward in the longitudinal motor vehicle direction.

If the guiding counter-element 16 is displaced into the recess 20 as a result of a relative movement of the front flap securing element 12 relative to the upper hinge portion 10, in particular in the case of the first crash instance, the guiding counter-element 16 and consequently the front flap securing element 12 is secured prior to a relative movement in the vertical motor vehicle direction downward by way of support on a wall which defines the recess 20.

The guiding element 14 comprises a recess 18 in an upper region in the vertical motor vehicle direction at the rear side in the longitudinal motor vehicle direction, in particular at the convex side. The guiding element 14 is thus configured to be open in the upper region in the vertical motor vehicle direction at the rear side in the longitudinal motor vehicle direction.

Consequently, the guiding counter-element 16 in a second crash instance, in which at least a force in the transverse motor vehicle direction also acts on the front flap hinge 4, in particular the upper hinge portion 10, can be removed from the guiding element 14 through the recess 18. A rigidity of the front flap hinge 4 is thereby reduced in the transverse motor vehicle direction.

LIST OF REFERENCE NUMERALS

2 Motor vehicle
4 Front flap hinge
6 Front flap
8 Body
10 Upper hinge portion
12 Front flap securing element
14 Guiding element
16 Guiding counter-element
18 Indentation
20 Recess
22 Lower hinge portion
24 Link

The invention claimed is:

1. A front flap hinge for a motor vehicle, comprising:
an upper hinge portion; and,
a front flap securing element which can be secured to a front flap of the motor vehicle and which is connected to the upper hinge portion so as to be able to be pivoted about a first pivot axis which extends in the transverse direction;
wherein the upper hinge portion comprises a guiding element in which a guiding counter-element of the front flap securing element is guided in a first crash instance; and,
wherein the guiding counter-element can be removed from the guiding element in a second crash instance.

2. The front flap hinge according to claim 1, wherein:
the guiding counter-element can be removed from the guiding element by displacing the guiding counter-element in the transverse direction; and/or,
by pivoting the guiding counter-element about a second pivot axis which extends in the vertical direction.

3. The front flap hinge according to claim 1, wherein the guiding element is a slotted guiding member and the guiding counter-element is a guiding journal which is arranged in the slotted guiding member.

4. The front flap hinge according to claim 1, wherein the guiding element is configured to be open in an upper region in the vertical direction, at the rear in the longitudinal direction.

5. The front flap hinge according to one of claim 1, wherein the guiding counter-element has such a length and/or such play in the guiding element that the guiding counter-element in the second crash instance can be removed from the guiding element by pivoting about the second pivot axis.

6. The front flap hinge according to claim 1, wherein:
the first crash instance is a front-end crash in which in the transverse direction no force acts on the upper hinge portion, or in which a force which acts on the upper hinge portion in the transverse direction is below a defined threshold value; and/or,
the second crash instance is a front-end crash, a side crash or an oblique crash in which at least also in the transverse direction a force acts on the upper hinge portion or in which a force acting on the upper hinge portion in the transverse direction equates to at least a defined threshold value.

7. The front flap hinge according to claim 1, wherein the guiding element comprises at the upper end thereof in the vertical direction a recess which extends forward in the longitudinal direction.

8. The front flap hinge according to claim 1, comprising a lower hinge portion which can be rigidly fixed to a body of the motor vehicle.

9. A motor vehicle comprising:
a front flap;
a body; and,
two front flap hinges according to claim 1, wherein the front flap securing elements are in each case rigidly connected to the front flap.

* * * * *